(12) United States Patent
Cho

(10) Patent No.: US 8,056,077 B2
(45) Date of Patent: Nov. 8, 2011

(54) APPARATUS AND METHOD FOR PERFORMING A TASK

(75) Inventor: Jung-yon Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1230 days.

(21) Appl. No.: 11/639,186

(22) Filed: Dec. 15, 2006

(65) Prior Publication Data

US 2007/0271567 A1    Nov. 22, 2007

(30) Foreign Application Priority Data

May 16, 2006 (KR) ......................... 10-2006-0043987

(51) Int. Cl.
*G06F 9/46* (2006.01)
*G06F 15/16* (2006.01)

(52) U.S. Cl. .................. 718/100; 709/204; 709/205

(58) Field of Classification Search .................. None
See application file for complete search history.

(56) References Cited

U.S. PATENT DOCUMENTS

| | | | | |
|---|---|---|---|---|
| 5,995,721 A * | 11/1999 | Rourke et al. | ............... | 358/1.15 |
| RE37,258 E * | 7/2001 | Patel et al. | ................... | 358/1.15 |
| 6,825,943 B1 * | 11/2004 | Barry et al. | .................. | 358/1.15 |
| 6,988,139 B1 | 1/2006 | Jervis et al. | | |
| 2002/0113989 A1 * | 8/2002 | Ferlitsch et al. | ............. | 358/1.15 |
| 2002/0186384 A1 * | 12/2002 | Winston et al. | ................ | 358/1.5 |
| 2002/0186407 A1 * | 12/2002 | Laughlin | ...................... | 358/1.15 |
| 2003/0069921 A1 * | 4/2003 | Lamming et al. | ............ | 709/203 |
| 2003/0208691 A1 * | 11/2003 | Smart et al. | .................... | 713/201 |
| 2004/0196496 A1 * | 10/2004 | Klassen | ........................ | 358/1.15 |
| 2004/0261076 A1 | 12/2004 | Kondo | | |
| 2005/0102675 A1 | 5/2005 | Parkyn | | |
| 2005/0275852 A1 * | 12/2005 | Ferlitsch | ........................ | 358/1.6 |

FOREIGN PATENT DOCUMENTS

| | | |
|---|---|---|
| JP | 9-185589 A | 7/1997 |
| JP | 2001-306204 A | 11/2001 |
| JP | 2003-162515 A | 6/2003 |
| JP | 2004-278344 A | 10/2004 |
| JP | 2004-289684 A | 10/2004 |
| JP | 2005-078563 A | 3/2005 |
| KR | 10-2002-0079203 A | 10/2002 |
| KR | 10-2004-0009268 A | 1/2004 |
| KR | 10-2004-0066547 A | 7/2004 |
| KR | 10-2005-0046580 A | 5/2005 |
| WO | WO 00/39964 A1 | 7/2000 |

OTHER PUBLICATIONS

Communication from the Japanese Patent Office dated Apr. 6, 2010 issued in counterpart Japanese Application No. 2007-123401.
Communication from the Japanese Patent Office dated Aug. 10, 2010, in counterpart Japanese Application No. 2007-123401.

* cited by examiner

*Primary Examiner* — Qing Wu
(74) *Attorney, Agent, or Firm* — Sughrue Mion, PLLC

(57) ABSTRACT

An apparatus and method for performing a task, which can modify a task depending on devices connected through a network, are provided. The apparatus includes a task information storage unit, a device information determination unit, and a task information modification unit. The task information storage unit stores task information including at least one operation. The device information determination unit determines information about devices which are connected to the apparatus through a predetermined network and which support respective operations included in the stored task information. The task information modification unit modifies the stored task information when modification of a specific operation is required as a result of determination by the device information determination unit.

14 Claims, 8 Drawing Sheets

APPARATUS AND METHOD FOR PERFORMING A TASK

CROSS-REFERENCE TO RELATED APPLICATION

This application claims priority from Korean Patent Application No. 10-2006-0043987 filed on May 16, 2006 in the Korean Intellectual Property Office, the disclosure of which is incorporated herein by reference in its entirety.

BACKGROUND OF THE INVENTION

1. Field of the Invention

Apparatuses and methods consistent with the present invention relate to performing a task and, more particularly, to an apparatus and method for performing a task, which can modify a task depending on devices connected through a network.

2. Description of the Related Art

Recently, with the development of communication and network technology, various types of home networks have appeared. Various technologies for increasing the convenience with which a user can control and monitor various devices, constituting a home network, have been proposed.

In an environment in which a plurality of devices are connected to each other through a network, as in the case of a home network, and respective devices perform unique functions, a task requested by a user or an external system is represented by a combination of operations, which are functions supported by the devices connected to each other through the network.

In other words, a task requested by a user or an external system includes at least one operation, and the task is completed when all operations included in the task are completed.

Respective operations included in the task are in an incomplete state at an initial time, and are sequentially performed in a predetermined sequence. In this case, if an operation to be performed first is performed by a specific device connected through the network, and the results of the performance of the operation are applied to the task, a subsequent operation is ready to be performed, and is also performed by a device that supports the operation.

FIG. 1 is a diagram showing a related art procedure for performing a task. In FIG. 1, the case where a task includes a first operation, a second operation and a third operation, and operations are sequentially performed in the order of first, second and third operations, is shown as an example. Further, the case where the first, second and third operations are supported by first, second and third devices, respectively, is shown as an example.

As shown in FIG. 1, the related art procedure for performing a task is performed so that, if a task 10 is initially requested by a user or an external system, operations are performed in a predetermined sequence for the operations 11, 12 and 13 included in the task 10. Since FIG. 1 illustrates an example in which operations are performed in the order of the first operation 11, the second operation 12 and the third operation 13, the first operation 11 in the task 10 is performed first by a first device 21.

Next, when the first operation 11 has been completed, the second operation 12 is performed by a second device 22. When the second operation 12 has been completed, the third operation 13 is performed by a third device 23. When the operation 13 has been completed, the requested task 10 is completed.

However, in FIG. 1, when the second device 22 that supports the second operation 12 is not powered on, or is disconnected from the network, there is a problem in that the second operation 12 cannot be performed after the first operation 11 has been completed, thus the task 10 is not completed.

In other words, in an environment in which the connection of devices dynamically varies, as in the case of a home network, the completion of the task 10 cannot be guaranteed even if the devices connected to the network are sufficiently accounted for at the time of generating the task 10.

Japanese Patent Publication No. 2004-278344 discloses a system and method of disposing a task allocation module between a multimedia printer and an external media processing system, thus outputting various types of input multimedia formats through printed output or electronic output. However, the disclosed system and method relate to a scheme of sharing task resources and performing a task through the use of the resources independently or in combination with each other, thus meeting various use purposes. However, a method is not provided for modifying a task depending on the connection of devices, in an environment in which the connection of the devices connected to a network dynamically varies.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an apparatus and a method for performing a task, which can modify an operation included in a task depending on variation in devices connected to a network, thus performing the task depending on the dynamically varying connection of devices.

In accordance with an exemplary aspect of the present invention, there is provided an apparatus for performing a task, the apparatus including: a task information storage unit which stores task information including at least one operation; a device information determination unit which determines information about devices which are connected to the apparatus through a predetermined network and which support respective operations included in the stored task information; and a task information modification unit which modifies the stored task information when modification of a specific operation is required as a result of determination by the device information determination unit.

In accordance with another aspect of the present invention, there is provided a method of performing a task, the method including: storing task information including at least one operation; determining information about devices which are connected through a predetermined network and which support respective operations included in the stored task information; and modifying the stored task information when modification of a specific operation is required as a result of determination of the information about the devices.

BRIEF DESCRIPTION OF THE DRAWINGS

The above and other aspects of the present invention will be more clearly understood from the following detailed description of exemplary embodiments taken in conjunction with the accompanying drawings, in which.

DETAILED DESCRIPTION OF EXEMPLARY EMBODIMENTS OF THE INVENTION

Figure 1:
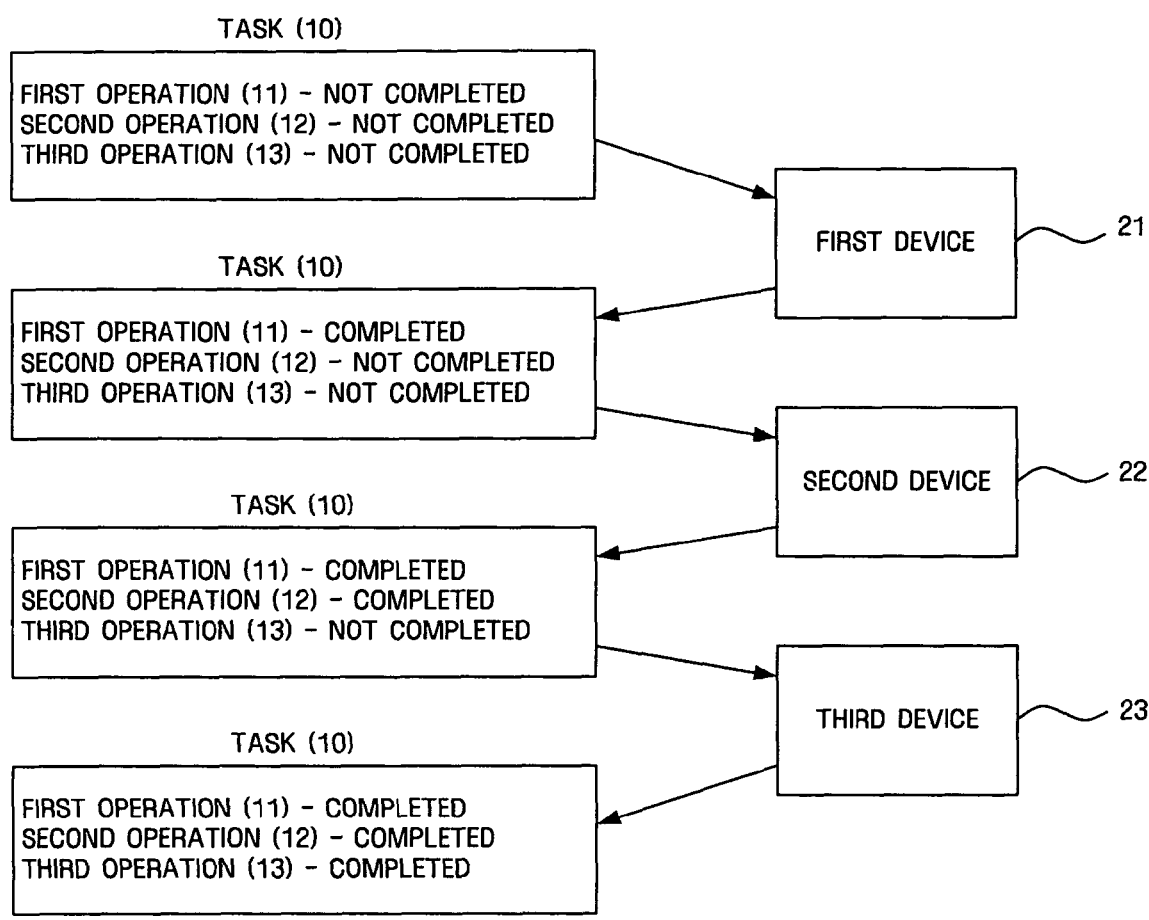
FIG. 1 is a diagram showing a related art procedure for performing a task.

Reference now should be made to the drawings, in which the same reference numerals are used throughout the different drawings to designate the same or similar components.

Hereinafter, the present invention will be described in detail with reference to the attached block diagrams or flowchart illustrations, which are used to describe an apparatus and method for performing a task according to exemplary embodiments of the present invention. It will be understood that each block of the flowchart illustrations, and combinations of blocks in the flowchart illustrations, can be implemented using computer program instructions. These computer program instructions can be provided to a processor of a general purpose computer, a special purpose computer, or other programmable data processing apparatus to produce a machine, such that the instructions, which execute on the processor of the computer or other programmable data processing apparatus, create means for implementing the functions specified in the flowchart block (or blocks).

These computer program instructions may also be stored in a computer-usable or computer-readable memory that can direct a computer or other programmable data processing apparatus to function in a particular manner, such that the instructions stored in the computer usable or computer-readable memory produce an article of manufacture including instruction means that implement the function specified in the flowchart block (or blocks). The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block (or blocks).

Further, each block of the flowchart illustrations may represent a module, segment, or portion of code, which comprises one or more executable instructions for implementing the specified logical function(s). It should also be noted that, in some alternative implementations, the functions noted in the blocks may occur in a different order. For example, two blocks shown in succession may in fact be executed substantially concurrently, or the blocks may sometimes be executed in reverse order, depending upon the desired functionality.

Figure 2:
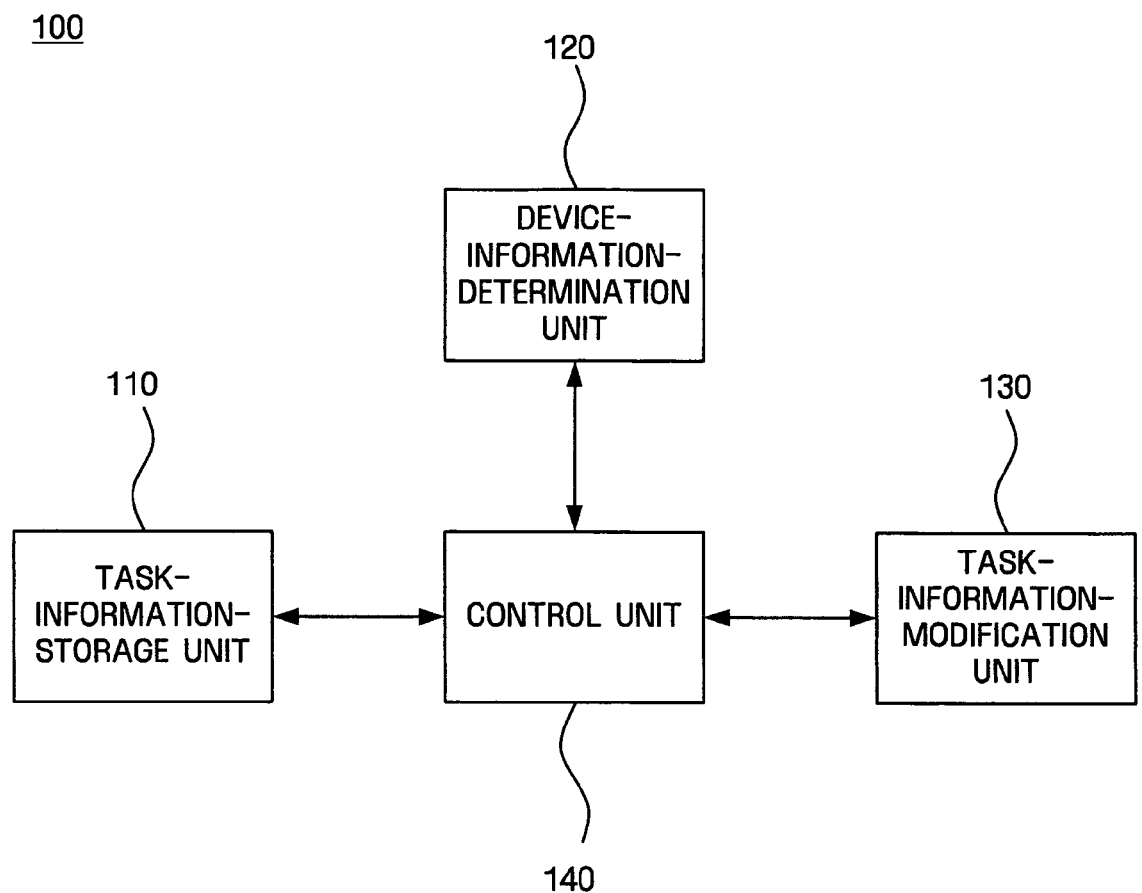
FIG. 2 is a diagram showing an apparatus for performing a task according to an exemplary embodiment of the present invention.

FIG. 2 is a diagram showing an apparatus for performing a task according to an exemplary embodiment of the present invention.

As shown in FIG. 2, an apparatus 100 for performing a task according to an exemplary embodiment of the present invention includes a task information storage unit 110 for storing task information including at least one operation, a device information determination unit 120 which determines information about devices that are connected to the apparatus 100 through a network and which supports respective operations included in the stored task information, a task information modification unit 130 which modifies the stored task information when the modification of a specific operation is found to be required as the result of determination by the device information determination unit 120, and a control unit 140 which performs a control operation so that respective operations, included in the stored task information, can be performed in a predetermined sequence.

In this case, the term 'operation' in the exemplary embodiments of the present invention can be understood to mean a function supported by a specific device connected through the network, and the term 'task information' can be understood to include various operations supported by respective devices connected through the network. For example, when a device for converting an image format and a device for printing an image are connected through the network, task information may include an operation of converting the format of a predetermined image, an operation of printing an image, etc. Further, in the embodiments of the present invention, the term 'network' can be understood to be any of various types of home networks, such as a Universal Plug and Play (UPnP) network, and respective devices connected to each other through the network can share task information therebetween.

The task information storage unit 110 can store task information, including various operations required to complete a predetermined task. The task information can include at least one operation. The operation included in the task information can be designated by a user, or a required operation can be automatically designated according to a task. In this case, when an operation for a predetermined task is automatically designated, the task information storage unit 110 can store a list in which operations corresponding to each task are arranged, etc., and can automatically designate an operation for a predetermined task using the stored list. In this way, the designated operation can be added, deleted or modified according to purpose and necessity.

For example, when a device for converting an image format and a device for printing an image are connected to each other through a network, the user can designate only an operation of printing an image, but not an operation of converting a predetermined image format. Further, the task information storage unit 110 can designate an operation required for a predetermined task using the above-described list.

The device information determination unit 120 can determine devices that support respective operations included in the task information stored in the task information storage unit 110. In this case, respective devices, connected to each other through the network, can be connected to the apparatus 100 for performing a task according to the embodiment of the present invention, thus sharing task information among the devices. Through the sharing of task information, the apparatus 100 for performing a task according to an exemplary embodiment of the present invention can determine whether devices that support respective operations included in the task information exist in the network. Such determination can be conducted by the device information determination unit 120.

Figure 3:
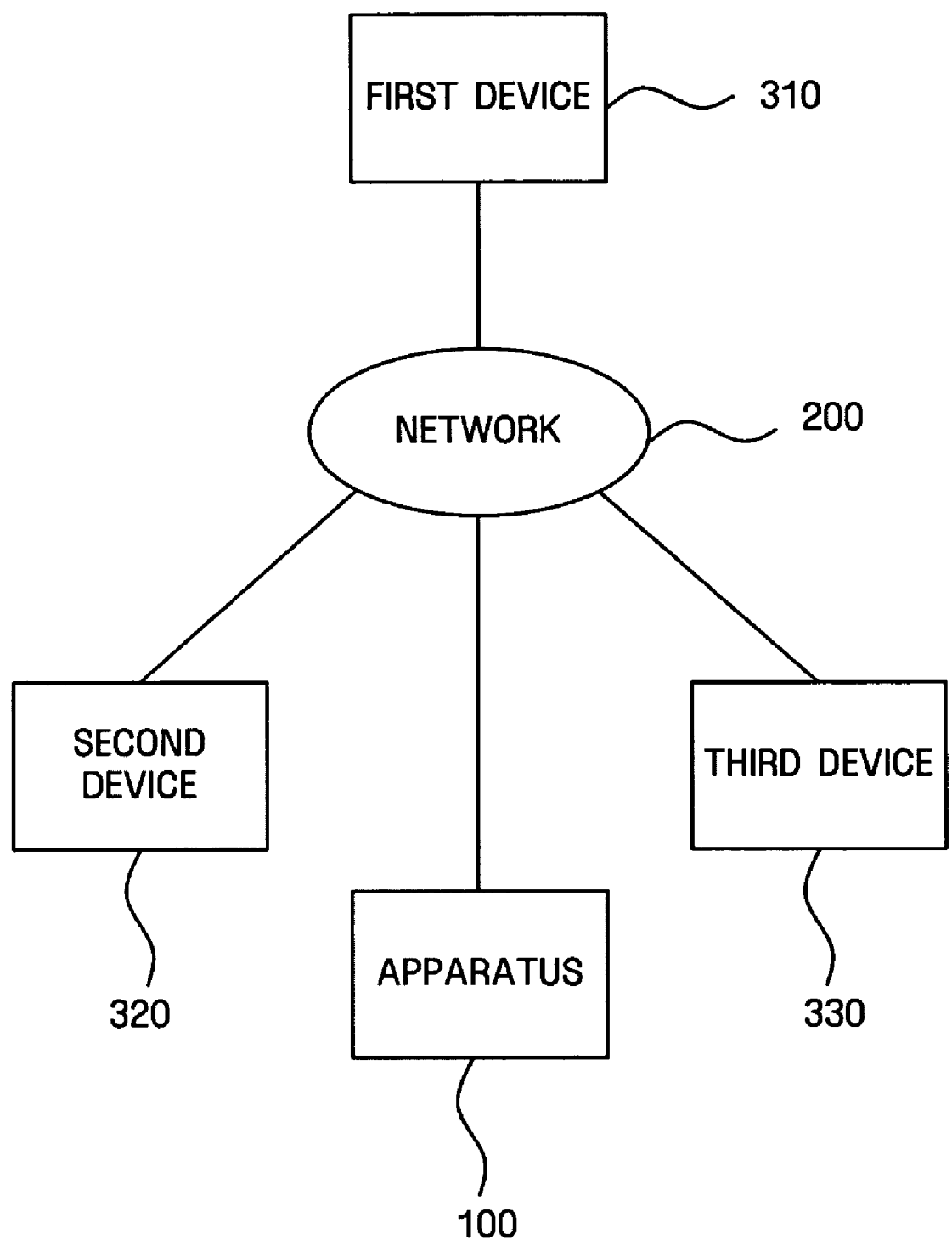
FIG. 3 is a diagram showing devices connected to a network according to an exemplary embodiment of the present invention.

FIG. 3 is a diagram showing devices connected to each other through a network according to an exemplary embodiment of the present invention.

As shown in FIG. 3, the apparatus 100 for performing a task according to an embodiment of the present invention can be connected to a first device 310, a second device 320 and a third device 320, which support specific operations, through a network 200. In FIG. 3, the case where three devices, that is, the first to third devices 310, 320 and 330, are connected through the network 200 is shown as an example, but it is only an exemplary embodiment for facilitating the understanding of the present invention, and devices connected to the network 200 can be added or deleted.

Therefore, the device information determination unit 120 can determine the operations supported by respective devices 310, 320 and 330 connected through the network 200 while sharing task information with the devices 310, 320 and 330, as shown in FIG. 3. Further, the device information determination unit 120 can also determine additionally supported operations, in addition to the operations that are supported by specific devices and are included in the task information.

If no device that supports an operation included in predetermined task information is found to exist as the result of determination by the device information determination unit 120, the task information modification unit 130 can modify a specific operation. In other words, the task information modification unit 130 can replace a specific operation with another operation, or combine a specific operation with a plurality of operations, or add other operations.

Hereinafter, in an embodiment of the present invention, task information stored in the task information storage unit 110 is referred to as 'first task information', and task information modified by the task information modification unit 130 is referred to as 'second task information'.

If no device that supports a specific operation included in the first task information is found to exist among the devices connected through the network, as the result of determination by the device information determination unit 120, the task information modification unit 130 can modify the specific operation included in the first task information.

In detail, referring to FIG. 3, the task information modification unit 130 can replace the second operation with another operation supported by the second device 320 when the first operation, the second operation and the third operation are included in first task information, the first device 310 supports the first operation, the third device 330 supports the third operation, and no device that supports the second operation exists in the network 200.

For example, if no device for adjusting the size of an image exists in the network 200, and the second device 320 can adjust the resolution of an image in the case where the first operation changes the image format from a Joint Photographic Experts Group (JPG) format to a Bitmap (BMP) format, the second operation adjusts the size of an image, and the third operation prints an image, the task information modification unit 130 replaces the second operation with the operation supported by the second device 320, thus modifying the first task information into the second task information.

Alternately, it is assumed that a first operation of changing an image format from a JPG format to a BMP format, a second operation of adjusting the size of an image and a third operation of printing an image are included in the first task information, that devices supporting the second and third operations exist in the network, but that no device supporting the first operation exists in the network, and, instead, that both a device for changing an image format from a JPG format to a Portable Network Graphics (PNG) format and a device for changing an image format from a PNG format to a BMP format exist. At this time, the task information modification unit 130 combines the operation of the device for changing an image format from a JPG format to a PNG format, with the operation of the device for changing an image format from a PNG format to a BMP format, and replaces the first operation with the combined operation, thus modifying the first task information into the second task information.

When a first operation of changing an image format from a JPG format to a BMP format, a second operation of adjusting the size of an image, and a third operation of printing an image are included in first task information, and the first to third devices 310 to 330 of FIG. 3 support the first to third operations, respectively, but the third device 330 is not powered on, the task information modification unit 130 adds an operation of powering on the third device 330, thus modifying the first task information into the second task information.

Further, in an embodiment of the present invention, a case where the task information modification unit 130 modifies task information through an operation supported by the device that is found by the device information determination unit 120 is described as an example. However, the present invention is not limited to the above example, and can modify a task through an operation supported by a device that has been previously found. In other words, a device that supports the modified operation does not necessarily exist in the network at the time when the modification of the operation is performed. If there is even a possibility that a corresponding device is to be connected to the network in the future, the task information can also be modified using the corresponding device.

The control unit 140 can control the transmission and reception of task information between the apparatus 100 for performing a task according to an exemplary embodiment of the present invention and the plurality of devices connected thereto through the network so as to share task information therebetween. Further, the control unit 140 can manage the completion of respective operations included in task information. In other words, if a specific operation has been completed when a plurality of operations is arranged in the performance sequence thereof in task information, the control unit 140 applies the results of the performance of the operation to the task information, and then allows a subsequent operation to be performed.

As described above, a case where the apparatus 100 for performing a task according to an embodiment of the present invention modifies and adds operations included in predetermined task information, depending on operations supported by respective devices connected through the network, is described as an example. However, the present invention is not limited to the above example, and allows the device, connected to the apparatus 100 through the network, to modify task information and to perform a specific operation depending on the modified task information.

In detail, as shown in FIG. 3, the apparatus 100 for performing a task according to the embodiment of the present invention is connected to the devices 310, 320 and 330 through the network 200, and can share task information with the devices. For example, the first device 310 can also determine the device that supports each operation included in predetermined task information, through the sharing of the task information.

Therefore, the specific device connected to the apparatus 100 through the network 200 can determine whether a device supporting a specific operation included in task information exists in the network 200. If no device supporting the operation is found to exist in the network 200, and the specific device itself supports an operation that can replace the specific operation, the specific device can modify the specific operation and perform the modified operation. In this case, the task information modified by the device connected to the network 200 can be applied to the task information stored in the task information storage unit 110.

In this case, when the specific device modifies and performs an operation, the task information modified according to the modified operation can be shared over the network 200 between the apparatus 100 for performing a task according to the embodiment of the present invention and respective devices connected through the network 200.

Figure 4:
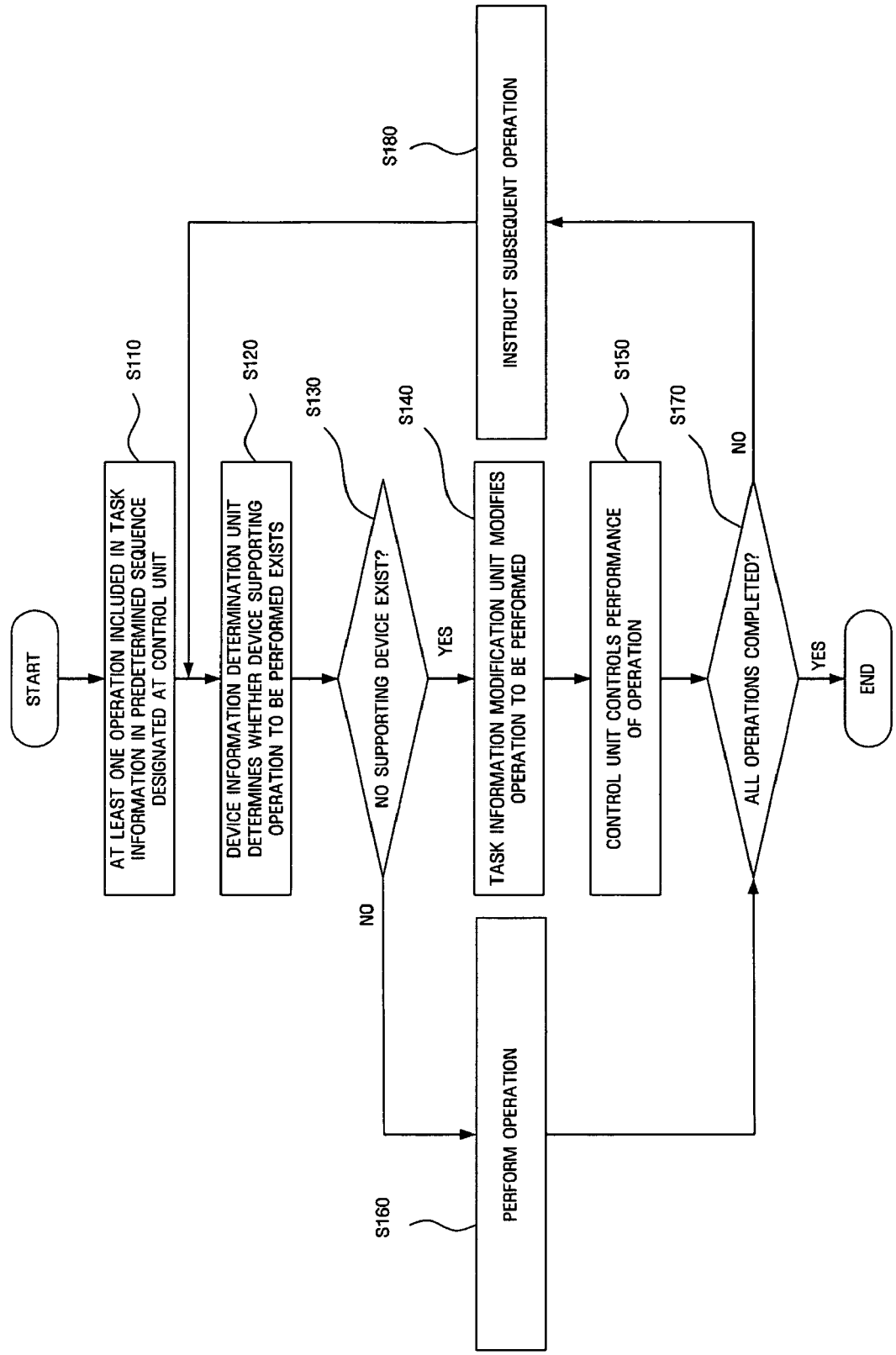
FIG. 4 is a flowchart showing a method of performing a task according to an exemplary embodiment of the present invention.

FIG. 4 is a flowchart showing a method of performing a task according to an embodiment of the present invention.

As shown in FIG. 4, in the method of performing a task according to an embodiment of the present invention, at least one operation, included in task information, stored in the task information storage unit 110 in a predetermined sequence, is designated at the control unit 140 at step S110. The operations included in the task information stored in the task information storage unit 110 can be designated by the user, or can be designated in advance according to a task.

The device information determination unit 120 determines whether a device that supports each operation included in the task information is connected through the network 200 at step S120. In other words, the task information stored in the task information storage unit 110 can include at least one operation. Respective operations can be performed by the same device or by different devices. Therefore, the device information determination unit 120 can determine whether devices for performing respective operations are connected to the network 200.

As the result of the determination by the device information determination unit 120, if no device supporting an operation to be performed by the control unit 140 is found to exist at step S130, the task information modification unit 130 modifies the operation included in the task information at step S140. In other words, the task information modification unit 130 can replace the operation to be performed by the missing device with another operation, or with a combination of other operations, or can add another operation. If the task information is modified by the task information modification unit 130 in this way, the control unit 140 controls performance of the modified operation at step S150.

If a device supporting the operation to be performed by the control unit 140 is found to exist at step S130, the operation is performed by the device at step S160.

Thereafter, the control unit 140 determines whether all operations have been performed at step S170. If not all operations are performed yet, a subsequent operation is instructed to be performed at step S180, and the above steps S120 to S160 can be repeated until all operations are completed.

Figure 5:
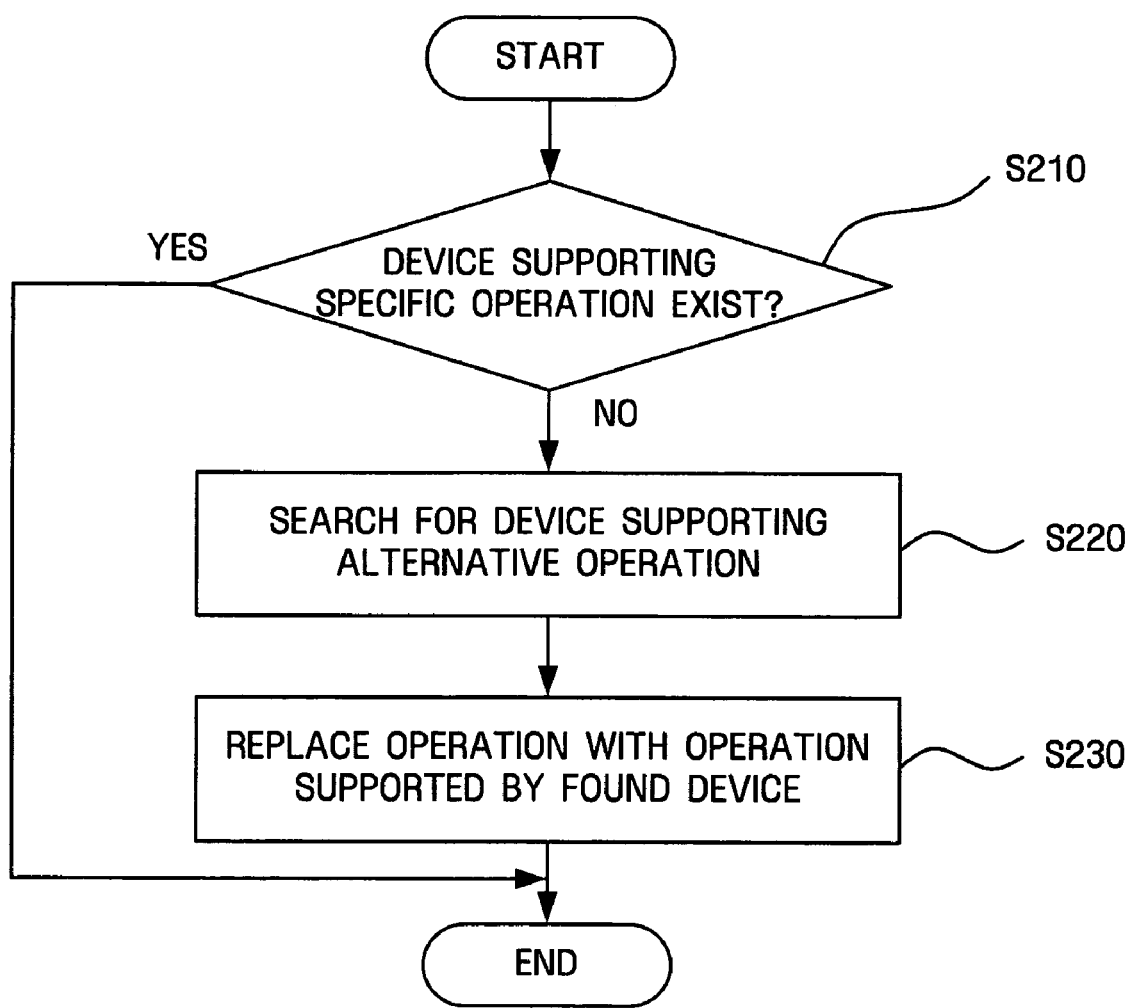
FIG. 5 is a flowchart showing a method of modifying task information according to an exemplary embodiment of the present invention.

FIG. 5 is a flowchart showing a method of modifying task information according to a first exemplary embodiment of the present invention. FIG. 5 illustrates an example in which no device supporting a specific operation among respective operations included in task information is connected to the network, and a device for performing an operation that can replace the specific operation exists.

As shown in FIG. 5, in the method of modifying task information according to the first embodiment of the present invention, if no device supporting a specific operation among the operations included in the task information is found to exist as the result of the determination by the device information determination unit 120 at step S210, the task information modification unit 130 searches for a device for performing an operation that can replace the specific operation at step S220.

In this case, if a device is found for performing an operation that can replace the specific operation, the task information modification unit 130 modifies the operation, which is not supported in the task information, into the alternative operation supported by the found device at step S230.

For example, when predetermined task information includes a first operation of changing an image format from a JPG format to a BMP format, a second operation of adjusting the size of an image, and a third operation of printing an image, and devices supporting the second and third operations exist in the network, but no device supporting the first operation exists, the task information modification unit 130 can search for a device for performing an operation that can replace the first operation.

In this case, if a device for performing an operation of changing an image format from a JPG format to a PNG format is found in the network, and a device supporting the second operation can print an image having a PNG format, the task information modification unit 130 can replace the first operation of changing an image format from a JPG format to a BMP format with the operation of changing an image format from a JPG format to a PNG format, thus modifying the task information.

Figure 6:
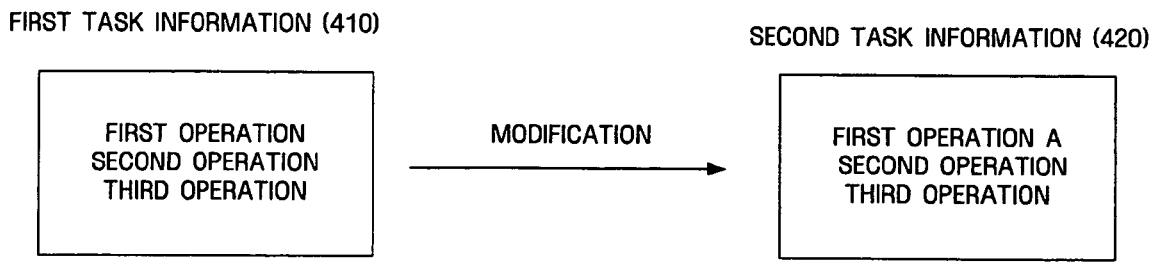
FIG. 6 is a diagram showing task information modified by the method of FIG. 5.

In other words, as shown in FIG. 6, task information 410 existing before modification may include a first operation and a second operation, whereas task information 420 obtained after modification may include a first operation A and the second operation because the first operation is replaced with the first A operation.

Figure 7:
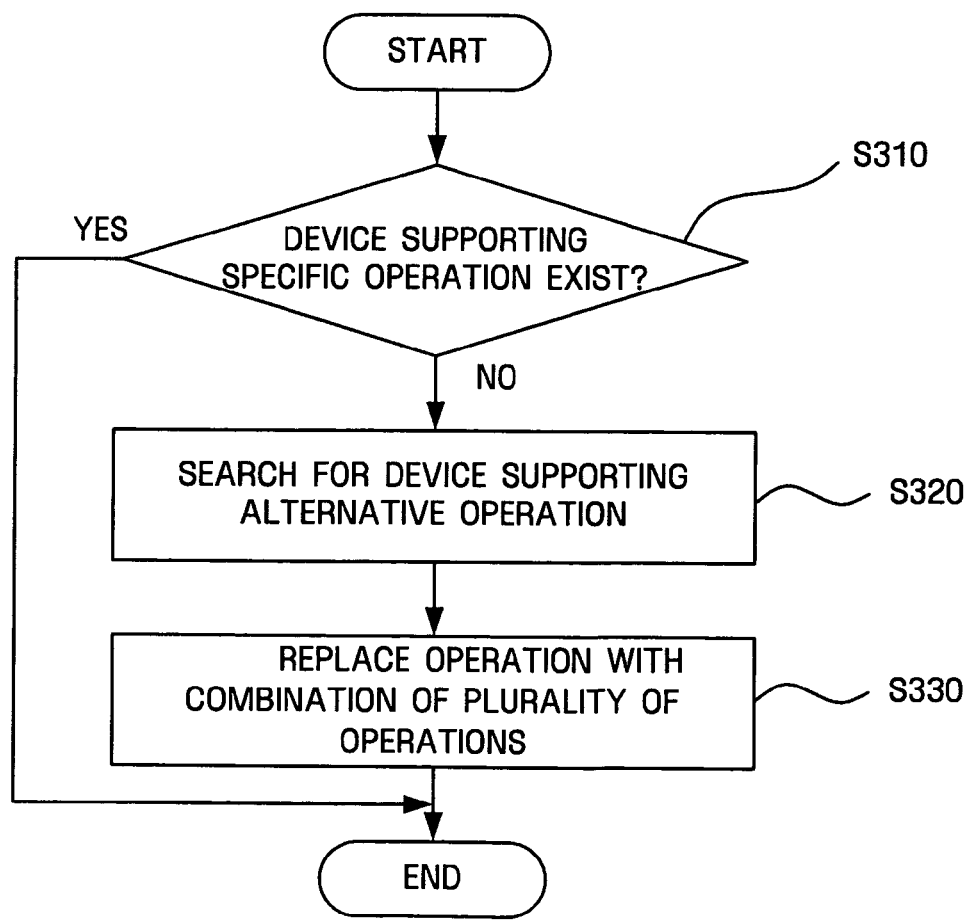
FIG. 7 is a flowchart showing a method of modifying task information according to an exemplary embodiment of the present invention.

FIG. 7 is a flowchart showing a method of modifying task information according to a second embodiment of the present invention. FIG. 7 illustrates an example in which an unsupported operation is replaced with other operations when no device supporting a specific operation among respective operations included in task information is connected to a network, and operations supported by a plurality of devices are combined with each other.

As shown in FIG. 7, in the method of modifying task information according to the second exemplary embodiment of the present invention, if no device supporting a specific operation among respective operations included in the task information is found to exist as the result of the determination by the device information determination unit 120 at step S310, the task information modification unit 130 searches for a device for performing an operation that can replace the specific operation at step S320.

If a plurality of devices that can replace the specific operation through a combination of operations is found in the operations included in the task information, the task information modification unit 130 replaces the specific operation, which is not supported in the task information, with a plurality of operations supported by the plurality of found devices at step S330.

For example, when predetermined task information includes a first operation of changing an image format from a JPG format to a BMP format, a second operation of adjusting the size of an image, and a third operation of printing an image, and devices supporting the second and third operations exist in the network, but no device supporting the first operation exists, the task information modification unit 130 can search for a plurality of devices for performing operations that can replace the first operation.

In this case, if a device for performing an operation of changing an image format from a JPG format to a PNG format and a device for performing an operation of changing an image format from a PNG format to a BMP format are found through the network, the first operation of changing an image format from a JPG format to a BMP format can be replaced with a combination of a first operation A of changing an image format from a JPG format to a PNG format and a first operation B of changing an image format from a PNG format to a BMP format.

Figure 8:
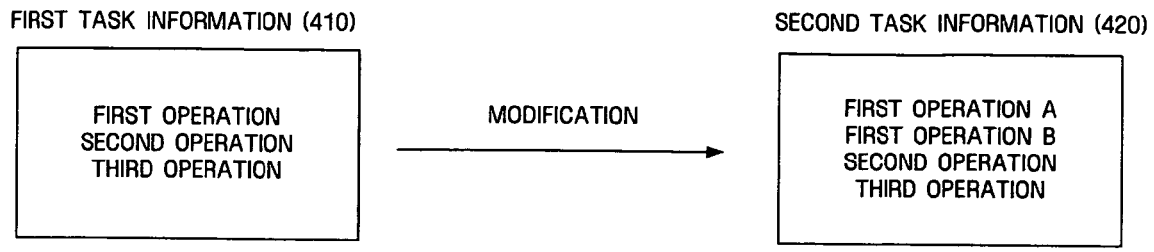
FIG. 8 is a diagram showing task information modified by the method of FIG. 7.

In other words, as shown in FIG. 8, task information 410 existing before modification can include a first operation, a second operation and a third operation. However, task information 420 obtained after modification can include a first operation A, a first operation B, the second operation and the third operation because the first operation is replaced with a combination of the first operation A and the first operation B.

Figure 9:
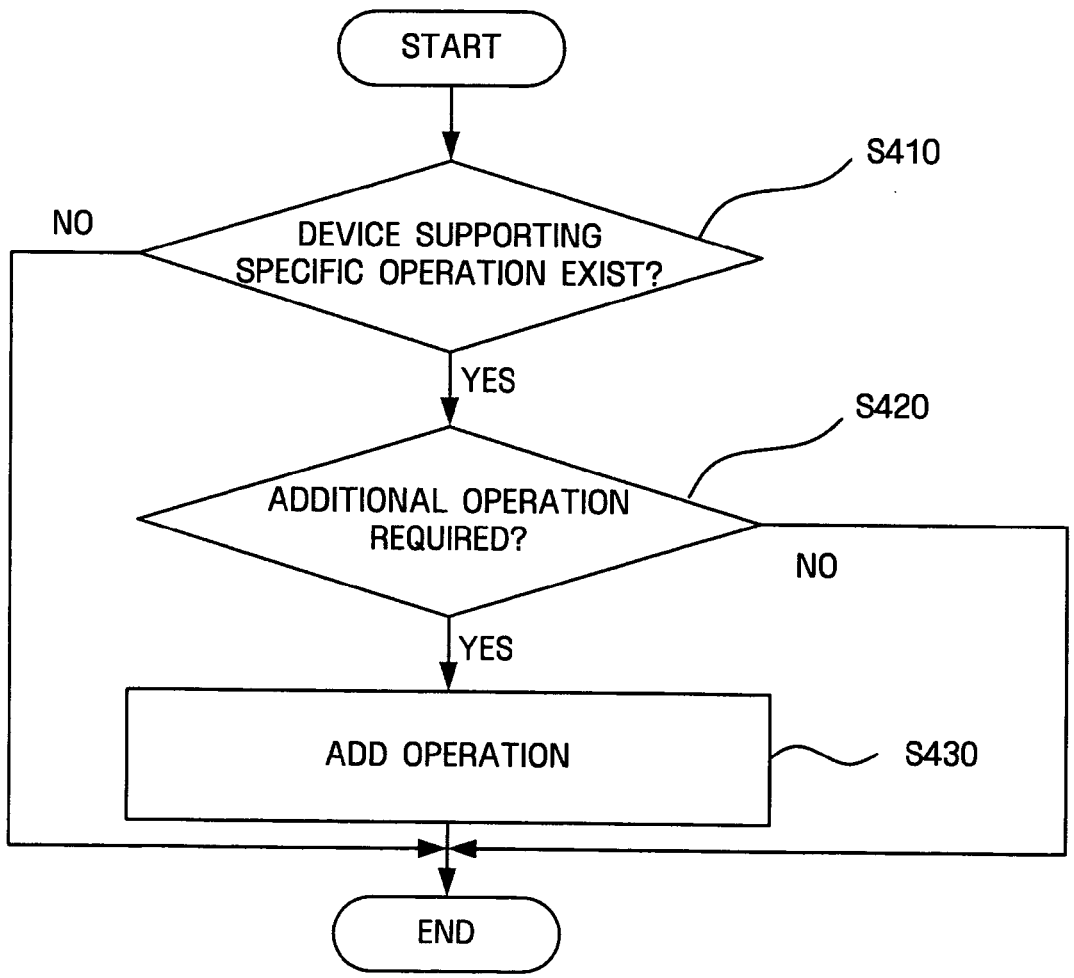
FIG. 9 is a flowchart showing a method of modifying task information according to an exemplary embodiment of the present invention.

FIG. 9 is a flowchart showing a method of modifying task information according to a third exemplary embodiment of the present invention. FIG. 9 illustrates an example in which a separate operation is additionally required when respective operations included in task information are performed.

As shown in FIG. 9, in the method of modifying task information according to the third embodiment of the present invention, if a device supporting a specific operation among respective operations included in task information is found to exist as the result of the determination by the device information determination unit 120 at step S410, the task information modification unit 130 determines whether an additional operation is required so as to perform the specific operation at step S420. Further, if no device supporting the specific operation is found to exist at step S410, the operation can be modified through the method of FIG. 5 or FIG. 7.

If an additional operation is required as the result of the determination, the corresponding operation is added at step S430.

For example, when predetermined task information includes a first operation of changing an image format from a JPG format to a BMP format, a second operation of adjusting the size of an image, and a third operation of printing an image, and an operation of powering on a device for printing an image to perform the third operation is required, the task information modification unit 130 can add the operation of powering on the device for printing an image.

In other words, task information 410 existing before modification can include a first operation, a second operation and a third operation, whereas task information 420 obtained after modification can additionally include a fourth operation of powering on a device for printing an image before the third operation is performed, in addition to the first, second and third operations.

Figure 10:
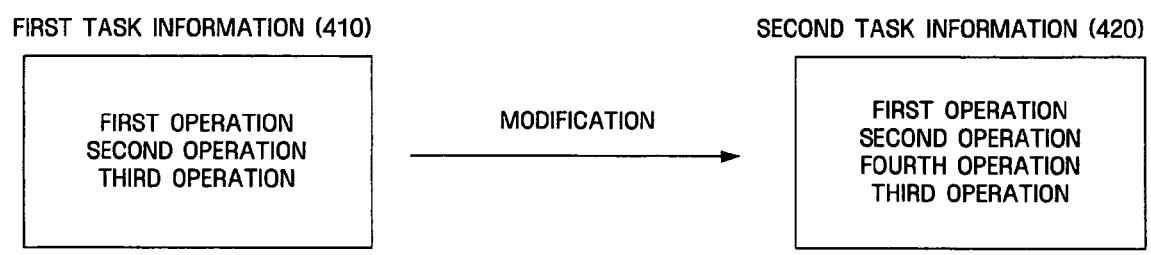
FIG. 10 is a diagram showing task information modified by the method of FIG. 9.

In FIGS. 9 and 10, the case where an operation that can be performed by the same device is added is described as an example. However, the present invention is not limited to the above example, and can add an operation that is performed by a device other than the devices for performing respective operations included in task information. For example, when the resolution of an image is intended to be changed in order to adjust the size of an image in the second operation, an operation supported by a separate device for performing this operation can be added.

As described above, in FIGS. 5 to 10, the case where the apparatus 100 for performing a task according to the present invention modifies task information is described as an example. However, the present invention is not limited to the above example, and can allow the modification of task information to be performed by a specific device connected to the network.

In detail, in an embodiment of the present invention, task information can be shared with other devices connected through the network, in addition to the apparatus 100 according to an embodiment of the present invention. Therefore, the devices connected through the network can also determine whether a device capable of performing each operation included in task information exists. Further, each device connected through the network can determine that it can perform another operation capable of replacing a specific operation included in the task information. Therefore, the devices connected through the network can modify a specific operation included in the task information, as shown in FIGS. 5 to 10. For this operation, each device connected through the network can include all of the components 110, 120, 130 and 140 in the apparatus 100 for performing a task according to the embodiment of the present invention, or can selectively include some of them.

The term 'unit', as used herein, means, but is not limited to, a software or hardware component, such as a Field Programmable Gate Array (FPGA) or an Application Specific Integrated Circuit (ASIC), which performs certain tasks. A unit may advantageously be configured to reside on the addressable storage medium and may be configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or may be further separated into additional components and units.

As described above, the present invention provides an apparatus and method for performing a task, which can modify respective operations included in a task depending on operations that can be performed by respective devices when the operations that can be performed by respective devices are occasionally changed in an environment in which the connection of the devices constituting a network dynamically varies, thus increasing the probability of completion of a task.

Although exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for performing a task, the apparatus comprising:
 a task information storage unit which stores task information including at least one operation;
 a device information determination unit which determines information about devices which are connected through a predetermined network to the apparatus and support respective operations included in the stored task information;
 a task information modification unit which modifies the stored task information when modification of a specific operation is required as a result of a determination by the device information determination unit, and a controller comprising a processor which controls the task information storage unit, the device information determination unit, and the task information modification unit, wherein the controller transmits the task information to at least one device connected through the network and which applies results of performance of the specific operation, included in the task information, to the task information, wherein a specific device among the at least one device connected through the network determines whether it supports an operation which replaces the specific operation when no device supporting the specific operation included in the task information is found to exist in the network, on the basis of the transmitted task information, and wherein the specific device connected through the network modifies the task information and transmits the modified task information to another device connected through the network when the specific device is found to support the operation replacing the specific operation as a result of the determination.

2. The apparatus of claim 1, wherein the device information determination unit determines whether a device that supports a specific operation included in the stored task information exists.

3. The apparatus of claim 1, wherein the device information determination unit searches for at least one device that supports an operation to replace a specific operation included in the stored task information if no device supporting the specific operation is found to exist.

4. The apparatus of claim 3, wherein the task information modification unit replaces the specific operation, included in the stored task information, with an operation supported by at least one of a device found by the device information determination unit and a previously found device.

5. The apparatus of claim 1, wherein the task information modification unit replaces the specific operation, included in the stored task information, with a combination of operations supported by at least one found device.

6. The apparatus of claim 1, wherein the task information modification unit adds an operation additionally required to perform the specific operation, included in the stored task information.

7. A method of performing a task, the method comprising:
storing task information including at least one operation;
determining information about devices that are connected through a predetermined network and support respective operations included in the stored task information;
modifying the stored task information when modification of a specific operation is required as a result of determination of the information about the devices, and
transmitting the task information to at least one device connected through the network and applying results of performance of the specific operation, included in the task information, to the task information, wherein a specific device among the at least one device connected through the network determines whether it supports an operation replacing the specific operation if no device supporting the specific operation included in the task information is found to exist, on the basis of the transmitted task information, and wherein the specific device connected through the network modifies the task information and transmits the modified task information to another device connected through the network if the specific device is found to support the operation replacing the specific operation as a result of the determination.

8. The method of claim 7, wherein the determining the information about the devices comprises determining whether a device that supports a specific operation included in the stored task information exists.

9. The method of claim 7, wherein the determining the information about the devices comprises searching for at least one device that supports an operation and replacing the specific operation included in the stored task information, if no device supporting the specific operation is found to exist.

10. The method of claim 7, wherein the determining the information about the devices comprises utilizing results of a previous search if no device supporting the specific operation included in the stored task information is found to exist.

11. The method of claim 10, wherein the modifying the task information comprises replacing the specific operation, included in the stored task information, with an operation supported by a previously found device depending on a result of a previous search.

12. The method of claim 7, wherein the modifying the task information comprises replacing the specific operation, included in the stored task information, with an operation supported by a found device.

13. The method of claim 7, wherein the modifying the task information comprises replacing the specific operation, included in the stored task information, with a combination of operations supported by at least one found device.

14. The method of claim 7, wherein the modifying the task information comprises adding an operation additionally required to perform the specific operation included in the stored task information.

* * * * *